(12) United States Patent
Lee (10) Patent No.: US 7,387,105 B2
(45) Date of Patent: Jun. 17, 2008

(54) INJECTOR FOR DIESEL ENGINE

(75) Inventor: Joon Kyu Lee, Seongnam (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/542,399

(22) Filed: Oct. 3, 2006

(65) Prior Publication Data

US 2007/0246003 A1 Oct. 25, 2007

(30) Foreign Application Priority Data

Apr. 20, 2006 (KR) .................... 10-2006-0035858

(51) Int. Cl.
*F02B 3/00* (2006.01)
(52) U.S. Cl. .................. 123/305; 123/294; 123/299
(58) Field of Classification Search ............. 123/294, 123/299, 305, 617; 239/71, 73, 584, 102.2, 239/585.1
See application file for complete search history.

(56) References Cited

U.S. PATENT DOCUMENTS

| | | | | |
|---|---|---|---|---|
| 4,215,821 A | * | 8/1980 | Eblen ..................... | 239/533.4 |
| 6,431,469 B2 | * | 8/2002 | Lambert et al. ......... | 239/533.3 |
| 6,811,105 B2 | * | 11/2004 | Kato et al. ............... | 239/533.2 |
| 6,902,124 B2 | * | 6/2005 | Arndt et al. ............. | 239/533.2 |
| 7,055,762 B2 | * | 6/2006 | Gerber et al. ................. | 239/73 |

* cited by examiner

*Primary Examiner*—Willis R. Wolfe, Jr.
*Assistant Examiner*—Johnny H. Hoang
(74) *Attorney, Agent, or Firm*—Morgan Lewis & Bockius LLP

(57) ABSTRACT

An injector for a diesel engine that controls an injecting angle of a fuel in accordance with a driving type of the diesel engine. A nozzle body defines first and second injection holes for injecting a fuel into a combustion chamber and first and second needles selectively open and close the first and second injection holes by moving upwardly and downwardly along a guide portion. An ECU controls ignition timing and the opening and closing timings of the first and second ignition holes via the needles.

10 Claims, 10 Drawing Sheets

Injecting angle(Deisel combustion method)

FIG.2C

Injecting angle(HCCI combustion method)

INJECTOR FOR DIESEL ENGINE

CROSS-REFERENCE TO RELATED APPLICATION

This application claims priority to and the benefit of Korean Patent Application No. 10-2006-0035858 filed in the Korean Intellectual Property Office on Apr. 20, 2006, the entire contents of which are incorporated herein by reference.

BACKGROUND OF THE INVENTION (a) Field of the Invention

The present invention relates to an injector for a diesel engine. More particularly, the present invention relates to an injector for a diesel engine that controls the injecting angle of fuel in accordance with a driving type of the diesel engine.

(b) Description of the Related Art

Due to exhaust gas regulations for diesel engine vehicles, diesel engine designers are developing a diesel engine in which fuel is burned by a new combustion method, often referred to as a homogeneous charge compressed ignition (HCCI) engine. With reference to the accompanying drawings, the concept of the HCCI engine will hereinafter be described in detail.

Figure 7:
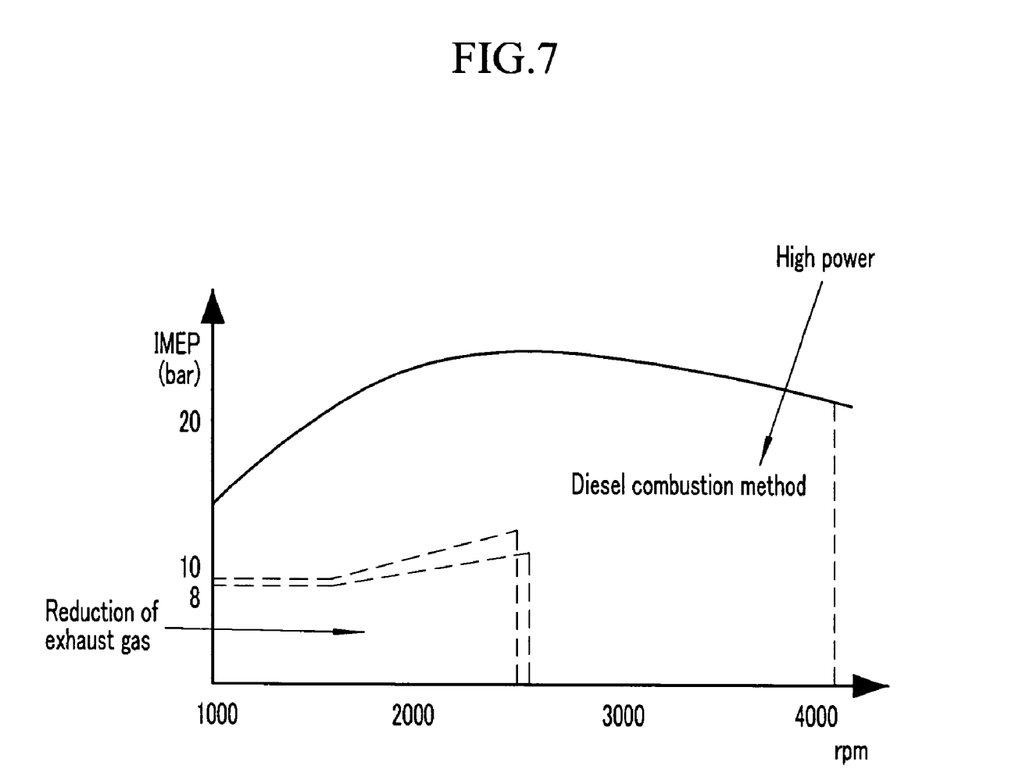
FIG. 7 is a graph showing average effective pressure and driving type based on an engine speed according to an HCCI engine.
Figure 8A:
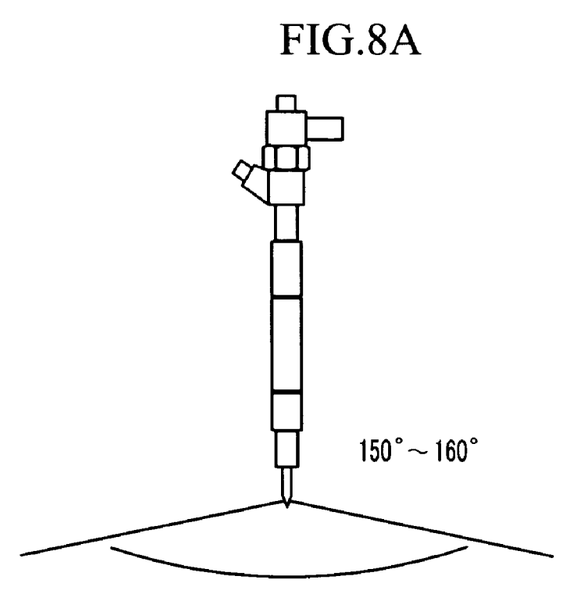
FIG. 8A is a schematic diagram showing an injecting angle of an injector according to a conventional diesel combustion method.
Figure 8B:
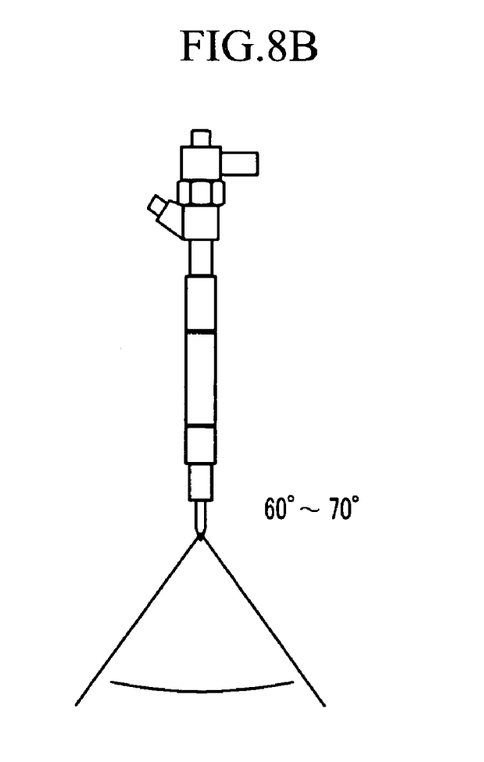
FIG. 8B is a schematic diagram showing an injecting angle of an injector according to an HCCI combustion method.

FIG. 7 is a graph showing average effective pressure and driving type based on an engine speed according to an HCCI engine. As shown in FIG. 7, according to the HCCI engine, a fuel is burned by an HCCI combustion method under a part load condition where a large quantity of exhaust gas is generated, and is burned by a conventional diesel combustion method under a full load condition where high power is needed. In other words, as shown in FIG. 8A, the fuel is injected into a chamber with a wide injecting angle (about 150-160°) under the part load condition. In contrast, the fuel is injected into the chamber with a narrow injecting angle (about 60-70°) under the full load condition, as shown in FIG. 8B.

Figure 9:
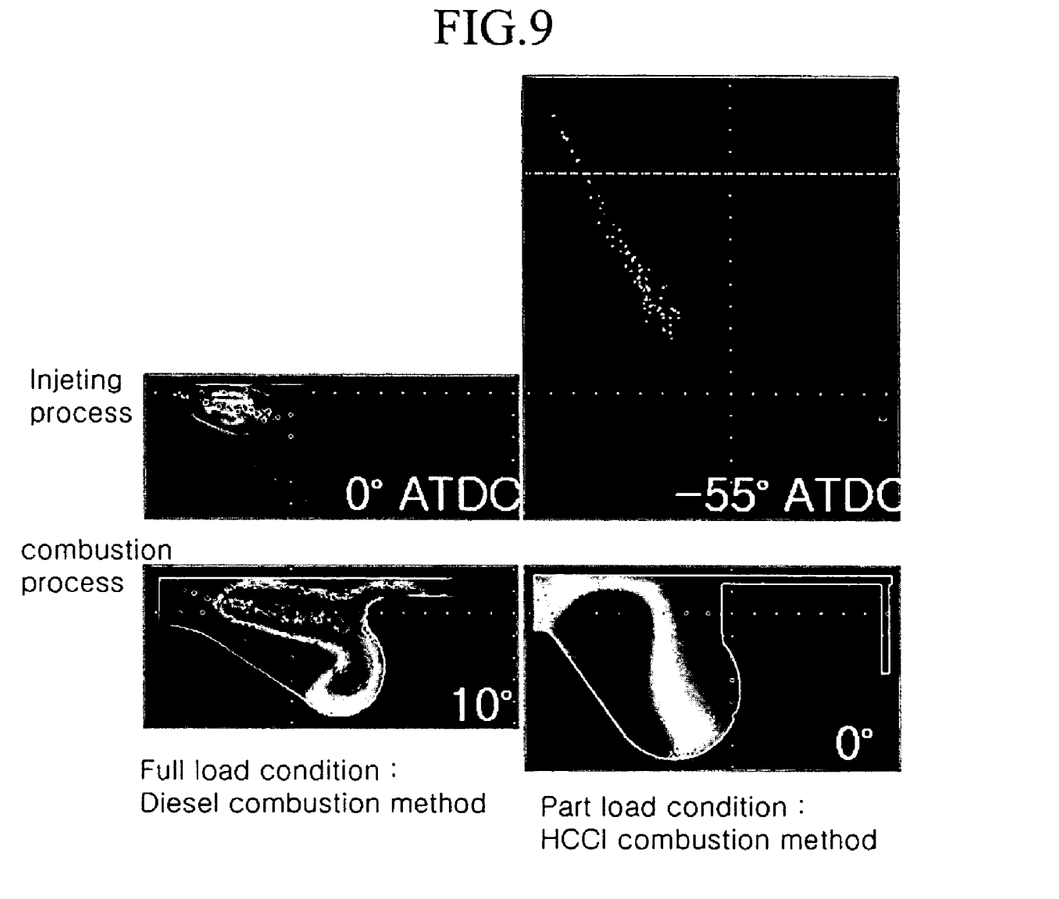
FIG. 9 is a figure showing analysis results at injection and combustion processes of a fuel.

FIG. 9 is a figure showing analysis results at injection and combustion processes of a fuel. A fuel is injected into a chamber at a top dead center (TDC) according to the conventional diesel combustion method. The injected fuel is mixed and simultaneously burned. Therefore, the fuel may not be sufficiently mixed and an incomplete combustion may partially occur. Therefore, smoke may occur in the combustion process, and exhaust gases may increase. Such an increase of exhaust gas is an innate drawback of the conventional diesel combustion method.

On the other hand, in the HCCI combustion method, the fuel is injected at 60-100° at a back top dead center (BTDC) in order to ensure a sufficient mixing time of the fuel However, if the fuel is injected with the injecting angle of the conventional diesel engine injector (about 150-160°) at the 60-100° BTDC, the injected fuel is adhered to a cylinder wall since inner pressure of the cylinder is very low. Accordingly, exhaust gases, such as smoke and HC, may increase. Therefore, an injector that has a smaller injecting angle (about 60-70°) is required to be used according to the HCCI combustion method where the fuel is injected at the 60-100° BTDC.

However, high power may not be generated according to the HCCI combustion method, and thus, the HCCI combustion method cannot be used for entire driving conditions of an engine.

To solve such problems, a diesel injector of a complex combustion method where the diesel combustion method is used together with the HCCI combustion method has been developed. According to the diesel injector of the complex combustion method, an injection hole that has a wide injecting angle and an injection hole that has a narrow injecting angle are formed in two rows, and a lifting amount of a needle is controlled so as to control the combustion method.

However, if the injection holes are formed in two rows, fuel can leak through the lower injection hole when the fuel is injected through the upper injection hole. Therefore, the injecting pressure of the fuel at the upper injection hole may be lowered.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide an injector for a diesel engine having with injection holes having different injecting angles that are independently opened and closed such that injecting pressure of a fuel is not compromised. Embodiments of the present invention may also provide for lowered production cost since hardware of a conventional diesel engine can be used and the structure of the injector is simplified. There can be further advantages according to embodiments of the present invention in that opening and closing units of the injection holes react rapidly to an electrical signal of an engine control unit (ECU).

An exemplary injector for a diesel engine according to an embodiment of the present invention includes: a nozzle body having a guide portion therein and first and second injection holes for injecting a fuel into a combustion chamber, the first and second injection holes being formed on a lower portion of the guide portion; first and second needles for selectively opening and closing the first and second injection holes by moving upwardly and downwardly along the guide portion; an ECU for controlling an ignition timing and opening and closing timings of the first and second ignition holes; a needle actuator for selectively controlling upward and downward movements of the first and second needles according to an electrical signal of the ECU; a needle spring disposed between the needle actuator and the first and second needles and supplying a restoring force to the first and second needles; and first and second blocking units mounted on an upper portion of the guide portion, the first and second blocking units selectively blocking the upward movements of the first and second needles according to the electrical signal of the ECU.

The first and second injection holes may be formed substantially on the same circumference of the guide portion.

In addition, injecting angles of the first and second injection holes may be formed different from each other.

The first and second injection holes may be alternately formed.

The first injection hole may be formed at an angle of 75~80° with reference to an axial direction of the guide portion, and the second injection hole may be formed at an angle of 30~35° with reference to the axial direction of the guide portion.

One of the first and second needles may have a blade, and the other may have a groove where the blade is inserted.

The first and second blocking units may include: first and second pin actuators elongated and shortened according to the electrical signal of the ECU; and first and second pins connected respectively to the first and second pin actuators, and moving in a radius direction of the nozzle body.

The first and second pin actuators may be actuated independently.

The first and second pins may move inwardly by operations of the first and second pin actuators and respectively block upper ends of the first and second needles.

Pin springs may be respectively interposed between the nozzle body and the first and second pins.

The first and second pin actuators are piezo-actuators.

DETAILED DESCRIPTION OF THE EMBODIMENT

Exemplary embodiments of the present invention will hereinafter be described in detail with reference to the accompanying drawings.

Figure 1:
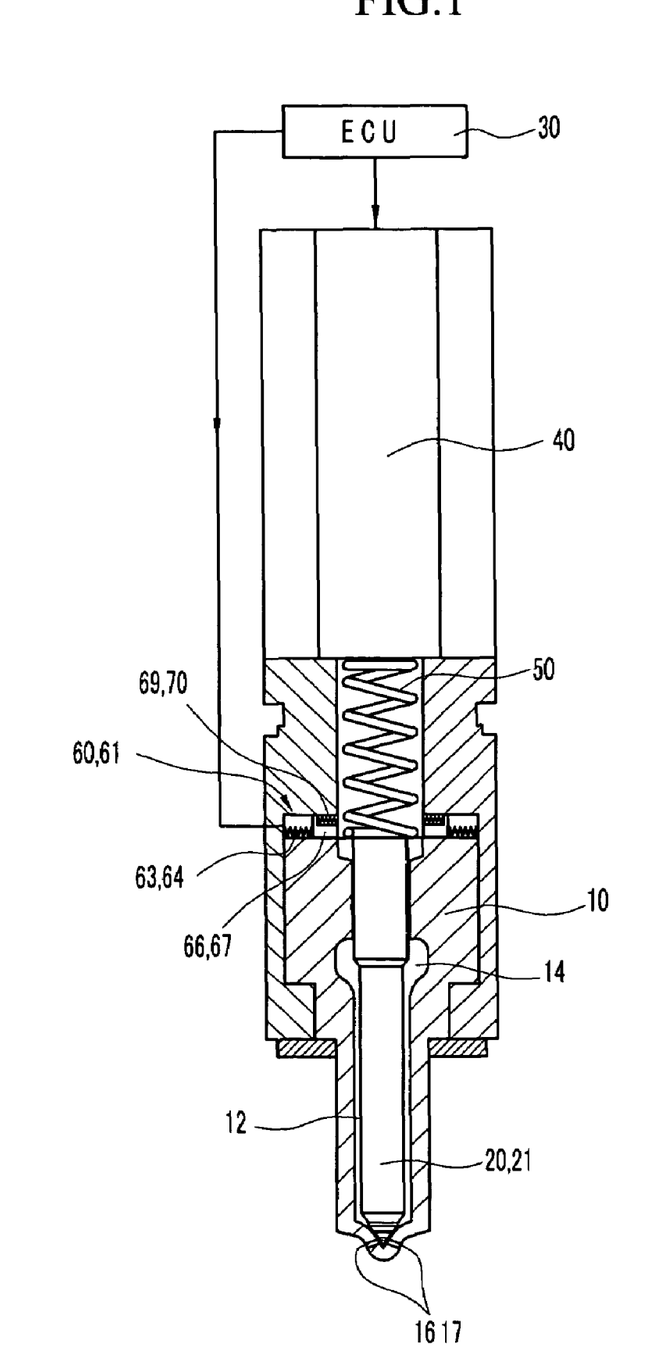
FIG. 1 is a cross-sectional view of an exemplary injector for a diesel engine according to an embodiment of the present invention.

As shown in FIG. 1, an exemplary injector for a diesel engine according to an embodiment of the present invention includes a nozzle body 10, first and second needles 20 and 21 (see also FIGS. 3A-3C), an engine control unit (ECU) 30, a needle actuator 40, a needle spring 50, and first and second blocking units 60 and 61. First and second injection holes 16 and 17 are formed on the nozzle body 10. The first and second needles 20 and 21 selectively open and close the first and second injection holes 16 and 17. The ECU 30 controls an ignition timing of the injector and opening and closing timings of the first and second injection holes 16 and 17. The needle actuator 40 selectively controls upward and downward movements of the first and second needles 20 and 21 according to an electrical signal from the ECU 30. The needle spring 50 is disposed between the needle actuator 40 and the first and second needles 20 and 21. The needle spring 50 applies a restoring force to the first and second needles 20 and 21. The first and second blocking units 60 and 61 selectively block the upward movements of the first and second needles 20 and 21.

A guide portion 12 is formed in the nozzle body 10 and the first and second needles 20 and 21 are inserted in the guide portion 12. The first and second injection holes 16 and 17 are formed on a lower portion of the guide portion 12 and a fuel is injected into a combustion chamber through the first and second injection holes 16 and 17.

The guide portion 12 guides the first and second needles 20 and 21 to move upwardly and downwardly. Lower portions of the first and second needles 20 and 21 are closely contacted to a lower portion of an interior circumference of the guide portion 12 so that fuel does not leak through the first and second injection holes 16 and 17 when the engine is not operated. In addition, a reservoir 14, where the fuel is temporarily stored, is formed at a middle portion of the guide portion 12. The reservoir 14 is connected to a fuel tank (not shown).

Figure 2A:
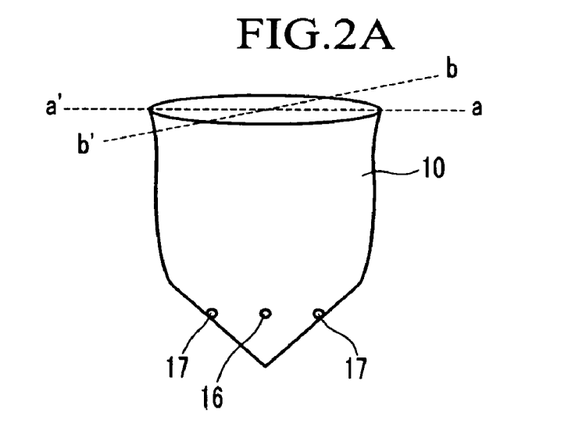
FIG. 2A is a schematic diagram showing first and second injection holes of an exemplary injector for a diesel engine according to an embodiment of the present invention.
Figure 2B:
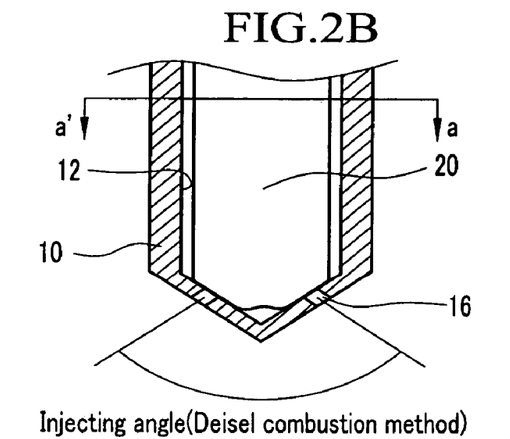
FIG. 2B is a cross-sectional view showing a first injection hole of an exemplary injector for a diesel engine according to an embodiment of the present invention.
Figure 2C:
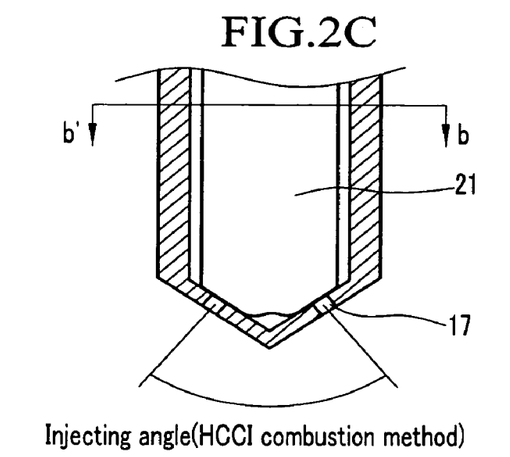
FIG. 2C is a cross-sectional view showing a second injection hole of an exemplary injector for a diesel engine according to an embodiment of the present invention.

As shown in FIG. 2A, FIG. 2B, and FIG. 2C, the first and second injection holes 16 and 17 are formed on the lower portion of the guide portion 12. The first and second injection holes 16 and 17 have different injecting angles so that the fuel is injected with a different angle with reference to an axial direction of the guide portion 12 according to a driving condition of the engine. According to an exemplary embodiment of the present invention, first injection hole 16 is formed at an angle of about 75-80° with reference to the axial direction of the guide portion 12 so as to inject the fuel under a full load condition. In contrast, second injection hole 17 is formed at an angle of about 30-35° with reference to the axial direction of the guide portion 12 so as to inject the fuel under a part load condition according to an exemplary embodiment of the present invention. In addition, the injecting angles of the first and second injection holes 16 and 17 may be adjusted according to the intention of the engine designer, the driving conditions of the engine, and combustion conditions.

In addition, as shown in FIG. 2A, the first and second injection holes 16 and 17 are formed substantially on the same circumference of the guide portion 12. If one of the first and second injection holes 16 and 17 is opened, the other is completely closed so that fuel does not leak through an unselected injection hole. The first and second injection holes 16 and 17 are independently opened and closed. The first and second injection holes 16 and 17 may be alternately formed so that fuel is equally injected into the combustion chamber.

The first and second needles 20 and 21 are inserted in the guide portion 12. The first and second needles 20 and 21 selectively open and close the first and second injection holes 16 and 17 according to the upward and downward movements of the first and second needles 20 and 21. In a state that the fuel is not injected, the first and second needles 20 and 21 respectively close the first and second injection holes 16 and 17. However, when the needle actuator 40 is operated and lifts the first and second needles 20 and 21, the first and second injection holes 16 and 17 are opened. In this case, the fuel stored in the reservoir 14 and the guide portion 12 is injected into the combustion chamber through the first and second injection holes 16 and 17 by pressure.

Figure 3A:
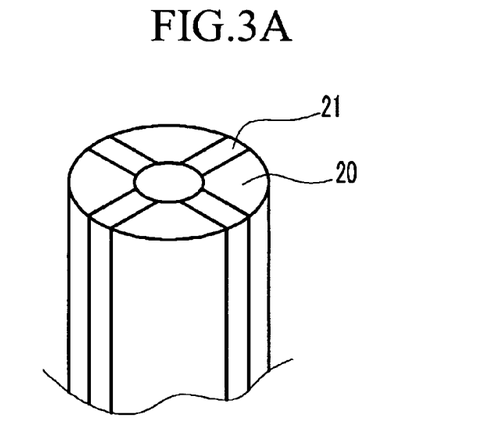
FIG. 3A is a schematic diagram showing a combination of first and second nozzles of an exemplary injector for a diesel engine according to an embodiment of the present invention.
Figure 3B:
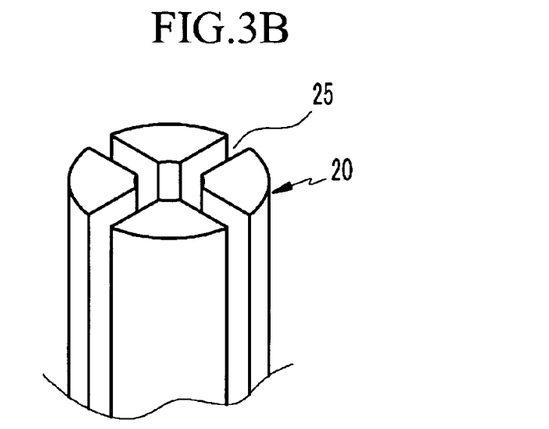
FIG. 3B is a schematic diagram showing a first nozzle of an exemplary injector for a diesel engine according to an embodiment of the present invention.
Figure 3C:
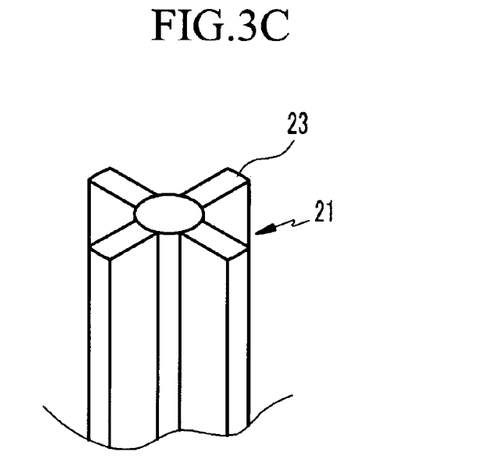
FIG. 3C is a schematic diagram showing a second nozzle of an exemplary injector for a diesel engine according to an embodiment of the present invention.

As shown in FIG. 3A-C, a blade 23 is formed on one of the first and second needles 20 and 21, and a groove 25 is formed on the other so that the first and second needles 20 and 21 slide against each other.

The ECU 30 transfers the electrical signal to the needle actuator 40 and the first and second pin actuators 63 and 64 that will be described later. The ECU 30 controls opening and closing timings of the first and second injection holes 16 and 17. ECU 30 may comprise a processor, memory, and associated hardware and software as may be selected and programmed by persons of ordinary skill in the art based on the teachings of the present invention as contained herein.

Needle actuator 40 receives an electrical signal from the ECU 30 and lifts the first and second needles 20 and 21 in response thereto. The needle actuator 40 may be a solenoid, a piezo-actuator or other suitable transducer.

The needle spring 50 is interposed between the needle actuator 40 and the first and second needles 20 and 21. When the needle actuator 40 is operated and lifts the first and second needles 20 and 21, the needle spring 50 is compressed. However, when the needle actuator 40 is not operated, the needle spring 50 applies a restoring force to the first and second needles 20 and 21 so that the first and second needles 20 and 21 respectively close the first and second injection holes 16 and 17.

Figure 4A:
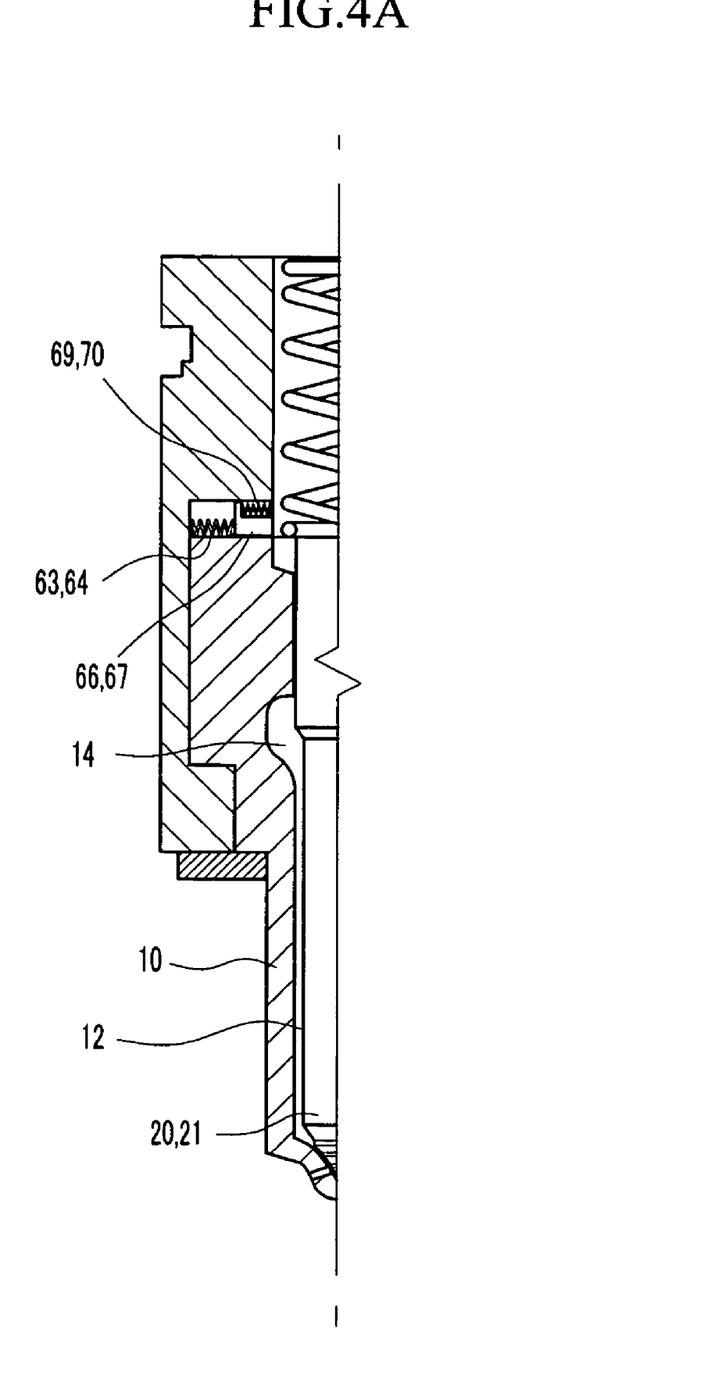
FIG. 4A is a cross-sectional view showing a state in which pin actuators are not operated according to an embodiment of the present invention.
Figure 4B:
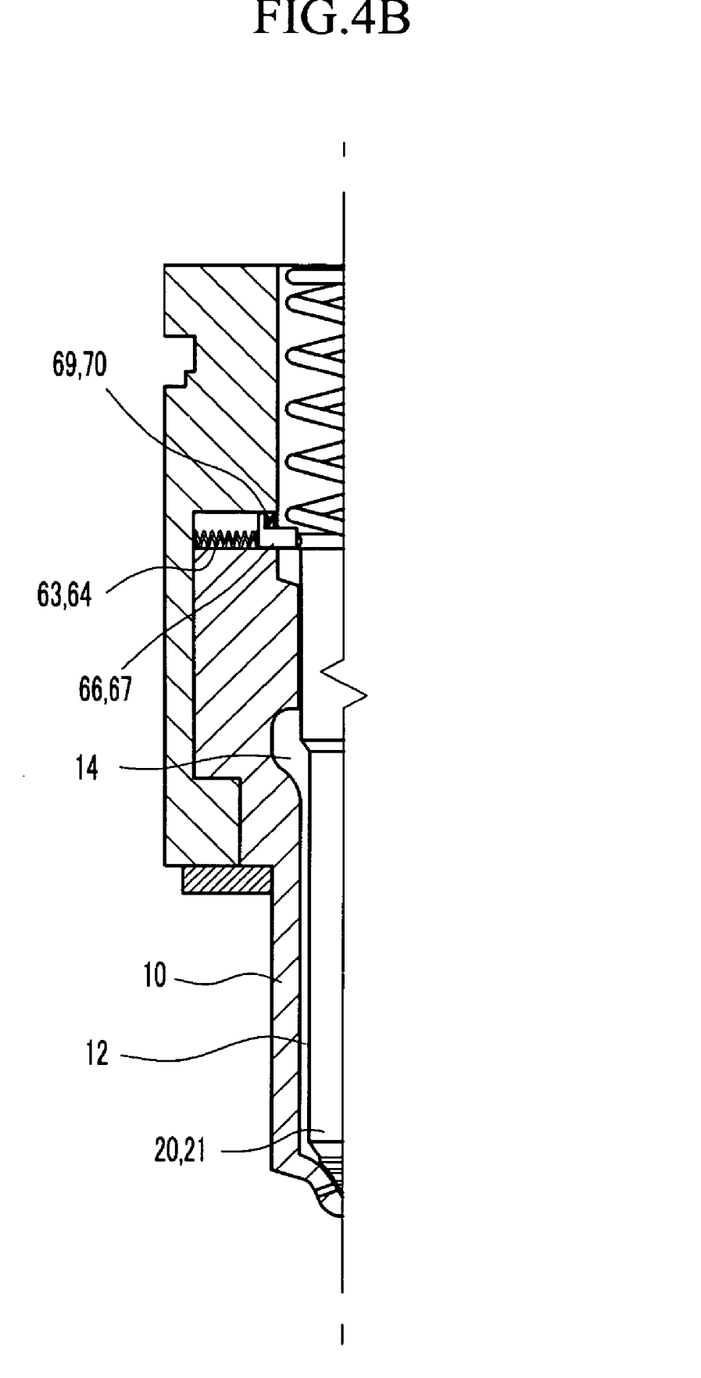
FIG. 4B is a cross-sectional view showing a state in which pin actuators are operated according to an embodiment of the present invention.

As shown in FIGS. 4A and B, the first and second blocking units 60 and 61 selectively block the upward movements of the first and second needles 20 and 21. The first and second blocking units 60 and 61 are mounted on an upper portion of the guide portion 12. The first and second blocking units 60 and 61 include the first and second pin actuators 63 and 64, first and second pins 66 and 67, and pin springs 69 and 70.

The first and second pin actuators 63 and 64 are independently operated. The first and second pin actuators 63 and 64 receive the electrical signal from the ECU 30, and are elongated and shortened according to the electrical signal of the ECU 30. In this case, the first and second pins 66 and 67 connected to the first and second pin actuators 63 and 64 move inwardly and outwardly in a radius direction of the nozzle body 10 and selectively block the upward movements of the first and second needles 20 and 21.

The first and second pin actuators 63 and 64 may be piezo-actuators, or other suitable transducers, that are controlled by the ECU 30 and can react quickly to the electrical signal of the ECU 30.

The first and second pins 66 and 67 are connected respectively to the first and second pin actuators 63 and 64, and move inwardly and outwardly in the radius direction of the nozzle body according to the elongation and shortening of the first and second pin actuators 63 and 64.

Pin springs 69 and 70 are interposed between the nozzle body 10 and the first and second pins 66 and 67. When the first and second pin actuators 63 and 64 are operated and the first and second pins 66 and 67 move inwardly, the pin springs 69 and 70 are shortened. When the first and second pin actuators 63 and 64 are not operated, the pin springs 69 and 70 apply a restoring force to the first and second pins 66 and 67.

Operation of an exemplary injector for a diesel engine according to an embodiment of the present invention will hereinafter be described below.

Figure 5A:
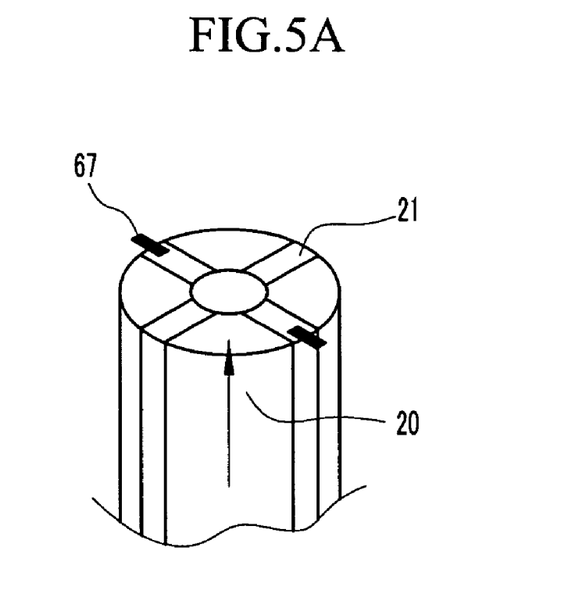
FIG. 5A is a schematic diagram showing how a second pin blocks an upward movement of the second nozzle according to an embodiment of the present invention.

In a state that the first and second injection holes 16 and 17 are closed by the first and second needles 20 and 21, the electrical signal of the ECU 30 is transmitted to the first and second pin actuators 63 and 64. As shown in FIG. 5A, if the electrical signal of the ECU 30 is transmitted to the second pin actuator 64, the second pin actuator 64 is elongated and the second pin 67 moves inwardly. In this case, the second pin 67 is positioned on an upper end of the second needle 21 and blocks the upward movement of the second needle 21. In this state, if the electrical signal of the ECU 30 is transmitted to the needle actuator 40, the needle actuator 40 lifts the first needle 20 and opens the first injection hole 16. Therefore, the fuel is injected by the diesel combustion method.

Figure 5B:
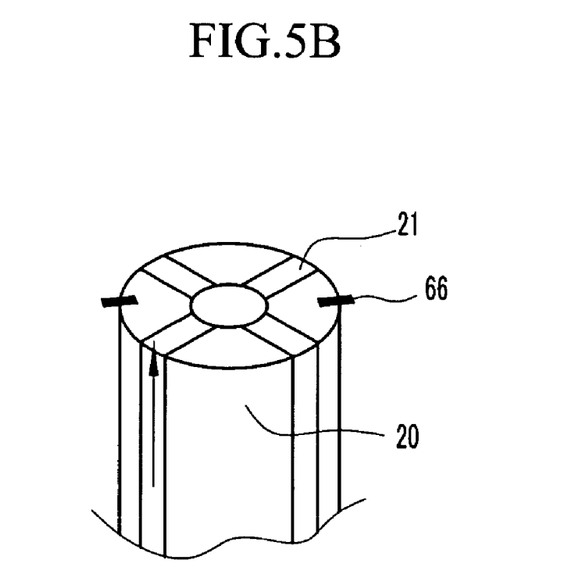
FIG. 5B is a schematic diagram showing how a first pin blocks an upward movement of the first nozzle according to an embodiment of the present invention.

As shown in FIG. 5B, if the electrical signal of the ECU 30 is transmitted to the first pin actuator 63, the first pin actuator 63 is elongated and the first pin 66 moves inwardly. In this case, the first pin 66 is positioned on an upper end of the first needle 20 and blocks the upward movement of the first needle 20. In this state, if the electrical signal of the ECU 30 is transmitted to the needle actuator 40, the needle actuator 40 lifts the second needle 21 and opens the second injection hole 17. Therefore, the fuel is injected by an HCCI combustion method.

Figure 6:
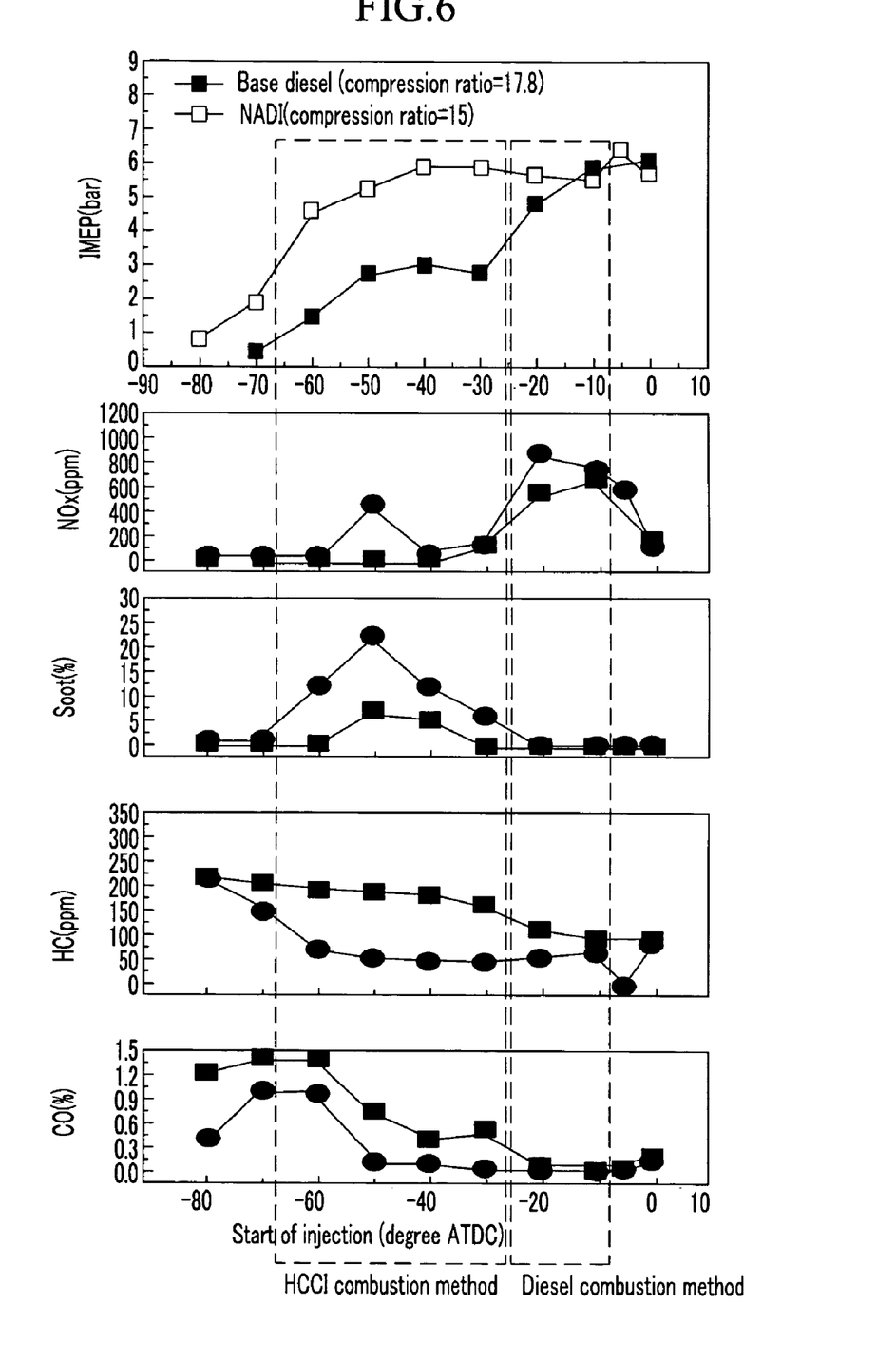
FIG. 6 is a graph showing analysis results of using an exemplary injector for a diesel engine according to an embodiment of the present invention.

As shown in FIG. 6, since the fuel is burned by the HCCI combustion method under a part load condition, exhaust gas is reduced according to the exemplary embodiment of the present invention. In addition, since the fuel is burned by the diesel combustion method under a full load condition, a sufficient power is generated according to the exemplary embodiment of the present invention.

As described above, since injection holes having different injecting angles are independently opened and closed, injecting pressure of the fuel is not lowered by embodiments of the present invention. In addition, since hardware of the conventional diesel engine is used and the structure of the injector is simplified, the production cost may be lowered. Moreover, since the first and second pin actuators are piezo-actuators or other quick acting transducers, the actuators may quickly react to the electrical signal of the ECU and an exact injection timing of the fuel may be guaranteed.

While this invention has been described in connection with what is presently considered to be a practical exemplary embodiment, it is to be understood that the invention is not limited to the disclosed embodiment, but, on the contrary, is intended to cover various modifications and equivalent arrangements included within the spirit and scope of the appended claims.

What is claimed is:

1. An injector for a diesel engine, comprising:
   a nozzle body having a guide portion therein and first and second injection holes for injecting a fuel into a combustion chamber, the first and second injection holes being formed on a lower portion of the guide portion;

first and second needles for selectively opening and closing the first and second injection holes by moving upwardly and downwardly along the guide portion;

an ECU for controlling an ignition timing and opening and closing timings of the first and second injection holes;

a needle actuator for selectively controlling upward and downward movements of the first and second needles according to an electrical signal from the ECU;

a needle spring disposed between the needle actuator and the first and second needles and applying a restoring force to the first and second needles; and first and second blocking units mounted on an upper portion of the guide portion, the first and second blocking units selectively blocking the upward movements of the first and second needles according to the electrical signal of the ECU, wherein one needle of the first and second needles has a blade, and the other needle defines a groove wherein the blade is received.

2. The injector of claim 1, wherein the first and second injection holes are formed on a common circumference of the guide portion.

3. The injector of claim 2, wherein injecting angles of the first and second injection holes are formed different from each other.

4. The injector of claim 3, wherein the first and second injection holes are alternately formed.

5. The injector of claim 3, wherein the first injection hole is formed at an angle of about 75-80° with reference to an axial direction of the guide portion, and the second injection hole is formed at an angle of about 30-35° with reference to the axial direction of the guide portion.

6. The injector of claim 1, wherein the first and second blocking units comprise:

first and second pin actuators elongated and shortened according to the electrical signal of the ECU; and first and second pins connected respectively to the first and second pin actuators, and moving in a radius direction of the nozzle body.

7. The injector of claim 6, wherein the first and second pin actuators are actuated independently.

8. The injector of claim 7, wherein the first and second pins move inwardly by operation of the first and second pin actuators and respectively block upper ends of the first and second needles.

9. The injector of claim 6, wherein pin springs are respectively interposed between the nozzle body and the first and second pins.

10. The injector of claim 6, wherein the first and second pin actuators are piezo-actuators.

* * * * *